Figure 1:
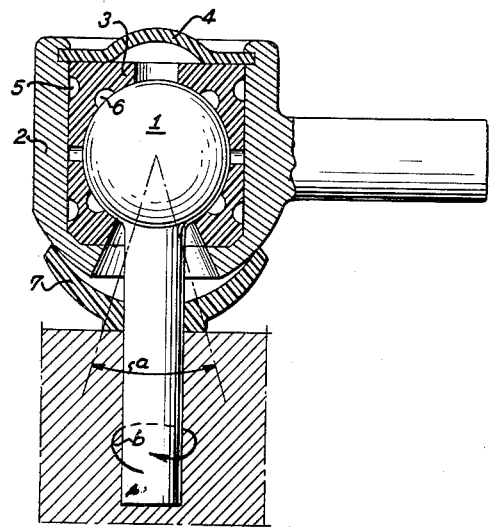

March 13, 1962  V. LANGEN  3,025,090

UNIVERSAL JOINT

Filed March 8, 1954

INVENTOR

VIKTOR LANGEN

BY Burgess Dinklage Sprung

ATTORNEYS

United States Patent Office 3,025,090
Patented Mar. 13, 1962

3,025,090
UNIVERSAL JOINT
Viktor Langen, Meererbusch, near Dusseldorf, Germany, assignor to Firma A. Ehrenreich & Cie., Dusseldorf-Oberkassel, Germany
Filed Mar. 8, 1954, Ser. No. 414,823
Claims priority, application Germany Mar. 9, 1953
6 Claims. (Cl. 287—87)

The invention relates to joints, especially universal joints, and more particularly to ball joints such as are used for the steering gears of motor vehicles. When in use, these ball joints mostly carry out simultaneously angular deflections at right angles to the axis of the ball and socket and rotary movements around the ball and socket. Furthermore, the joints are subjected to thrust and impact stresses in the vertical and horizontal direction, varying in intensity. These joints must take up these stresses without damage, during relatively long running periods in order to ensure the safety of the vehicle.

Hitherto, the steel ball heads of the gudgeons were mounted in multipart steel housings under spring pressure. More or less elastic materials have also been tried in the construction of universal joints. In this connection there are two possible basic solutions. The one is to provide between the steel ball and the housing an intermediate layer of highly elastic material, such as soft rubber, firmly anchored to both parts. This solution, however, is not practicable for ball joints of the required small dimensions having an angle of deflection of more than 10°. The other solution is to surround the steel ball head with a plastic bearing on inversely, to mount a plastic ball with a steel core in a steel bearing.

The plastics hitherto used for this purpose did not, however, meet the requirements because they did not possess the necessary antifriction properties or the required resistance to wear and had no reserve or emergency running characteristics.

It has now been found that joints, especially ball joints, which stand up to the different loads and operate without attention, can be produced with plastics which belong to the group of the polycondensation products or polyaddition products with unreticulated or even with latticelike structure, such as by preference polyamides and polyurethanes.

These plastics to be used according to the invention, are unexpectedly capable of withstanding asymmetrical stresses such as are caused by the oscillating and tumbler movements which grind out the housing bearing (ball socket) and the high frequency impulses of which are superimposed transversely to the gudgeon. This is the case both with hard and also with soft adjustment.

When movement commences a certain cohesion of the sliding parts is to be observed at first, which only ceases and becomes a sliding movement under greater impulses. In the cohesive state a kind of milling of the plastic particles according to the invention takes place which they withstand in continuous service or under full load.

While the types of plastics to be used according to the invention possess excellent wear-resisting, antifriction and emergency running properties, yet they differ very considerably as regards their mechanical properties and consequently the construction of the joints must be adapted to these different properties.

In the case of hard plastics of the types above mentioned with only low tensional elasticity, for example less than 100%, the construction can be based on that hitherto employed for all-metal materials. For example either only the ball is coated on the outside or the housing on the inside with a thin layer of the plastic. If the necessary elasticity is not sufficient, steel springs are provided in addition.

The construction is different when using highly elastic plastics, for example the highly rubber-like polyurethanes, in which a high polymer precondensate is produced on the polyester basis; this is converted with a coating of di-isocyanate and the whole slightly cross-linked by the addition of water, glycolenes, diamines or the like. In this case the plastic itself, in the form of a layer several millimeters in thickness, serves as the resilient element. The necessary room for the expansion of the plastic cushion is provided by forming interstices, grooves, holes and the like. These plastics are highly elastic but scarcely allow any reduction in volume because they have no pores. Additions of lubricants, such as paraffin oil or paraffin wax, improve their antifriction properties.

On the basis of the polyesters converted with a di-isocyanate, plastics with porous or sponge-like structure can be produced. The lubrication problem with such plastics can be solved in a very advantageous manner because the porous plastic product can be saturated with lubricant and inserted in the joint in precompressed state.

When producing parts based on polyurethane there is the particularly advantageous possibility of homogeneously combining parts possessing different physical properties, for example parts with harder and softer, more elastic and possibly more porous structure. According to the invention, bearing sockets or ball coatings can be used which are built up in several layers.

The plastic parts can be shaped by any method. It is particularly advantageous in the case of polyamides or hard polyurethanes to use the spraying process, and of soft and frothy polyurethanes the casting process.

The plastics used according to the invention are remarkable for their particularly good antifriction properties and possess above all also emergency running or heavy duty properties. Joints made with the aid of these plastics operate practically without any attention. The universal joints were hitherto always protected against the penetration of dust and sand by packings. All measures employed for this purpose are, however, only imperfect so that it is always possible for foreign particles to penetrate the joints. As a result metal joints are in most cases seriously affected by the grinding effect of penetrating dust, show scores in the surface and become untrue. This objection does not occur at all or scarcely at all in the bearings according to the invention even if the packings should become damaged by bits of stone. The hard particles of dust collect even in the so-called hard types of plastics used according to the invention, even when no or only a small quantity of lubricant is present, that is the joints according to the invention continue to operate perfectly even under these extremely difficult conditions. This fact is also of importance for the operation of the joints without any attention.

Figure 2:
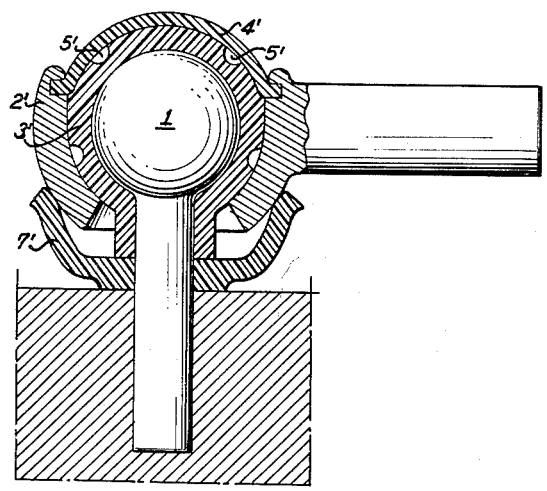

Two forms of construction of ball joints according to the invention are illustrated partly in section in the two figures of the accompanying drawing in which:

FIG. 1 is a vertical section of an embodiment of a ball joint in accordance with the invention, and FIG. 2 is a vertical section of a further embodiment of a ball joint in accordance with the invention.

In FIG. 1, 1 is a steel ball gudgeon and 2 a steel housing. The ball of the ball gudgeon 1 is enveloped in a hard, elastic, multi-layer plastic jacket 3. The outer side of the jacket is adapted to the shape of the housing 2. The ball 1 and the plastic jacket 3, after being united, are slipped into the housing 2 and held therein by a resilient element 4. The plastic jacket 3 has external recesses 5 and internal recesses 6 which serve for accommodating a reserve of lubricant.

The arrows $a$ and $b$ indicate that the ball joint carries out angular movements ($a$) and rotary movements ($b$).

The ball gudgeon may be packed against the housing by an elastic cap 7 which is slipped on to the gudgeon pin.

FIG. 2 shows another form of construction of the joint according to the invention. The same reference numerals are used to indicate similar parts to those shown in FIG. 1. In this case the ball gudgeon 1 is cast in a soft, elastic plastic jacket 3'. The recesses 5' in this instance serve both to allow deformation and also for the storage of lubricant.

I claim:

1. In a universal joint having at least two joint-bearing surfaces movable in contact with each other, the improvement which comprises one of the joint bearing surfaces comprising a cross-linked, polyurethane plastic material.

2. Improvement in accordance with claim 1, in which said joint is a ball joint, and in which said plastic material surrounds the ball.

3. Improvement in accordance with claim 1, in which said plastic material is of soft, porous structure.

4. Improvement in accordance with claim 1, in which the plastic material on said joint-bearing surface is a sprayed plastic material.

5. Improvement in accordance with claim 3, in which said porous plastic material is a lubricant saturated porous plastic material.

6. Improvement in accordance with claim 1 in which said plastic material is of the cast plastic material type.

References Cited in the file of this patent

UNITED STATES PATENTS

| | | |
|---|---|---|
| 2,288,160 | Flumerfelt | June 30, 1942 |
| 2,361,025 | Graham et al. | Oct. 25, 1944 |
| 2,424,431 | Booth | July 22, 1947 |
| 2,461,866 | Alldredge | Feb. 15, 1949 |
| 2,527,787 | Barger | Oct. 31, 1950 |
| 2,575,394 | Rice | Nov. 20, 1951 |
| 2,577,279 | Simon et al. | Dec. 4, 1951 |
| 2,591,832 | Kogstrom | Apr. 8, 1952 |
| 2,666,677 | Miller | Jan. 19, 1954 |
| 2,715,766 | Ricks | Aug. 23, 1955 |
| 2,729,618 | Muller et al. | Jan. 3, 1956 |